United States Patent [19]

Curnow et al.

[11] 4,302,414
[45] Nov. 24, 1981

[54] METHOD OF INCORPORATING MULTIFILAMENT STRANDS OF CARBON FIBERS INTO CEMENT TO PRODUCE REINFORCED STRUCTURES HAVING IMPROVED FLEXURAL STRENGTHS

[75] Inventors: Richard D. Curnow; Christopher G. Cowie, both of Bristol, England

[73] Assignee: Union Carbide Corporation, New York, N.Y.

[21] Appl. No.: 201,077

[22] Filed: Oct. 27, 1980

Related U.S. Application Data

[63] Continuation of Ser. No. 100,456, Dec. 5, 1979, abandoned, which is a continuation of Ser. No. 865,627, Dec. 29, 1977, abandoned.

[51] Int. Cl.³ .............................................. B28B 21/56
[52] U.S. Cl. ..................................... 264/137; 106/99; 264/256
[58] Field of Search ................................ 264/135–137, 264/228, 256; 106/99; 528/121, 407

[56] References Cited

U.S. PATENT DOCUMENTS

| Re. 27,061 | 2/1971 | Rubenstein | 264/228 X |
| 3,384,522 | 5/1968 | Rubenstein | 264/228 X |
| 3,468,090 | 9/1969 | L'Hermite | 264/135 X |
| 3,787,545 | 1/1974 | Chandler | 264/135 |
| 3,993,707 | 11/1976 | Cummings | 528/121 X |

FOREIGN PATENT DOCUMENTS 1425031  2/1976  United Kingdom .
1425032  2/1976  United Kingdom .

Primary Examiner—Thomas P. Pavelko
Attorney, Agent, or Firm—John R. Doherty

[57] ABSTRACT

Method of incorporating multifilament strands of carbon fibers into an aqueous hardenable hydraulic cementitious matrix which can be set to produce a reinforced structure having improved flexural strength which comprises treating the fiber strands with a hydrophobic resin system prior to adding them to the cementitious matrix.

5 Claims, 3 Drawing Figures

METHOD OF INCORPORATING MULTIFILAMENT STRANDS OF CARBON FIBERS INTO CEMENT TO PRODUCE REINFORCED STRUCTURES HAVING IMPROVED FLEXURAL STRENGTHS

This application is a continuation of our prior U.S. application: Ser. No. 100,456 filing date 12/5/79, now abandoned and/which is a continuation of application 865,627 filing date 12/29/77, now abandoned.

BACKGROUND OF THE INVENTION

This invention relates to an improved method of incorporating multifilament strands of carbon fibers into an aqueous hardenable hydraulic cementitious matrix which can be set to produce a carbon fiber-reinforced cementitious structure having improved flexural strength. More particularly, this invention relates to the preparation of a carbon fiber-reinforced structure having improved flexural strength from an aqueous hardenable hydraulic cementitious matrix containing multifilament strands of carbon fibers which have been treated with a hydrophobic resin system prior to being incorporated into the cementitious matrix.

Multifilament strands of carbon fibers have heretofore been employed to reinforce cement in an effort to increase the flexural strength of such cement. However, because of poor bonding between the filaments of the strands, and between the filaments of such strands and the cement, little or no improvement in the strength of the cement was attained by the addition of these fiber strands.

SUMMARY OF THE INVENTION

In accordance with the present invention it has now been discovered that a carbon fiber-reinforced cementitious structure having improved flexural strength can be prepared from an aqueous hardenable hydraulic cementitious matrix to which have been added multifilament strands of carbon fibers which have been treated with a hydrophobic resin system. The fiber-reinforced structures prepared in this manner have been found to exhibit increases in flexural strength in excess of fifty percent (50%) over the flexural strength of structures prepared in like manner from fiber strands which have not been treated with a hydrophobic resin system.

DETAILED DESCRIPTION OF THE INVENTION

Figure 1:
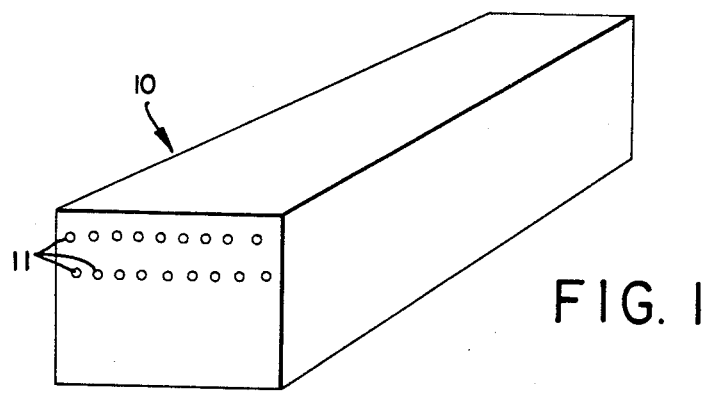
FIG. 1 is an isometric view showing the end portion of a cement beam which has been reinforced with multifilament strands of carbon fibers arranged in two horizontal rows.

Any hydraulic cement can be employed in the cement composition employed in the invention. Aggregate filler material may be employed together with the hydraulic cement in amounts conventionally employed. If a filler is employed, however, it is preferably a fine non-abrasive aggregate material, such as fly ash, and does not exceed twenty percent by weight of the total weight of the cement and aggregate material.

High modulus, high strength carbon fibers suitable for use in the instant invention can be prepared as described in U.S. Pat. Nos. 3,454,362, 3,412,062 and 4,005,183. The term "carbon" as used herein is intended to include graphitic and non-graphitic fibers.

The amount of fibers employed is such as to obtain the desired strength characteristics, typically from 1 part by weight to 6 parts by weight of fibers per 100 parts by weight of the "dry components" of the cementitious composition. By "dry components" in this context is meant the cement and other solid aggregate filler material (if present) which together make up the cementitious composition, but not including the carbon fiber itself. Most usually, the fibers are present in an amount of from 2.5 parts by weight to 5 parts by weight per 100 parts by weight of the dry materials.

The water, of course, must be employed in an amount sufficient to hydrate the cement. In order to produce cementitious structures having maximum strength, however, the amount of water should be held to a minimum consistent with this purpose. Typically, from about 25 parts by weight to about 55 parts by weight, preferably from about 30 parts by weight to 45 parts by weight, of water per 100 parts by weight of the dry components in the mix are employed.

Before the carbon fiber strands are incorporated into the aqueous hardenable hydraulic cementitious matrix they are impregnated with a suitable low viscosity hydrophobic resin system. Such impregnation may be effected by simply immersing the fibers in a liquid resin system for a time sufficient to thoroughly wet the fibers of the strands.

The hydrophobic resin system employed must be one which is both insoluble in water and capable of curing at room temperature simultaneously with the cement. While many resins are not hydrophobic, they may, nevertheless, be employed provided they become hydrophobic when a hardening agent is added thereto. The hydrophobic character of such resin system causes the expulsion of water present on the surfaces of the discrete cement particles in the vicinity of the resin which might otherwise interfere with the curing and bonding of the resin to these particles. As a result, an improved bond is effected between these particles and the fibers impregnated with the resin system. The resin system also provides improved interfilament bonding and structural integrity within the strands.

An epoxy resin system is preferably employed to treat the carbon fibers before they are incorporated into the cementitious matrix because such system is easy to handle and capable of being cured at room temperature. Such system comprises an epoxy resin together with a reactive epoxy resin hardener in an amount conventionally used in the art to cure epoxy resin.

The epoxy resins which are preferably employed to treat the carbon fibers before they are incorporated into the cementitious matrix are the liquid polyglycidyl ethers of polyhydric phenols, particularly the liquid diglycidyl ethers of bis(4-hydroxyphenyl)methane and bis(4-hydroxyphenyl)dimethylmethane. Such resins are usually produced by the reaction of epichlorohydrin with a polyhydric phenol in the presence of a base.

As is well known, by varying the proportions of reactants employed in producing an epoxy resin it is possible to produce a product varying in viscosity, molecular weight, and hydroxyl content. The resins employed in the instant invention are those low molecular weight, low viscosity, liquid epoxies in which, most preferably, the main or predominant constituent is free of hydroxyl groups, e.g., those epoxies in which the reaction product of two moles of epichlorohydrin with one mole of dihydric phenol is the main or predominant constituent. While hydroxyl groups are usually present in most all commercially available epoxy resins, many are available which have a low hydroxyl content, and resins of this type are most preferred for use in this invention. Especially preferred resins of this type are the diglycidyl ethers of bis(4-hydroxyphenyl)methane and the diglycidyl ethers of bis(4-hydroxyphenyl)dimethylmethane.

The hardening agent employed together with the epoxy resin must be one which forms a hydrophobic system with the resin and causes it to cure at room temperature. The room temperature cure is necessary to allow the resin to cure simultaneously with the cement, and the formation of a hydrophobic system is necessary to displace water present on the surfaces of the discrete cement particles in the vicinity of the resin which might interfere with the curing and bonding of the resin to these particles. In this manner, an improved bond is effected between these particles and the fibers which have been impregnated with the resin system. The resin system also provides improved interfilament bonding and structural integrity within the strands.

Among the epoxy resin hardeners which can be employed in the present invention are those hardeners sold as "Ancamine"* R (manufactured by Anchor Chemical Co. U.K. Ltd.) and "Sur-Wet"** R (manufactured by Pacific Anchor Co., Inc.). Both of these hardeners are hydrophobic fatty amines having an amine number of from 170 to 180. When admixed with an epoxy resin, the hydrophobic character of these hardeners is imparted to the entire resin system.

*"Ancamine" is a registered trademark of Anchor Chemicals Co., U.K.
**"Sur-Wet" is a registered trademark of Pacific Anchor Chemicals Co.

In a preferred embodiment of the invention, multifilament strands of carbon fiber in the form of roving, yarn or two are incorporated into the cementitious matrix in parallel rows. The fibers may be incorporated into the cementitious matrix in this manner by means of a mould having two side panels of fixed height and two end panels which are adjustable to various heights up to the height of the side panels. Typically, such a mould can be prepared by slotting the inner surfaces of the side panels near their ends so that they are capable of receiving a number of end panels of lesser height stacked one upon another. The first of such end panels is placed into position in the slots at one end of the side panels, and a like end panel is placed into position in the slots at the other end of the side panels. A cementitious mix of cement and water is then poured into the mould to the height of the end panels, and a continuous strand of carbon fiber is strung back and forth along the length of the mould on the surface of the cement using a row of upright posts at each end of the mould to reverse direction of the strand. To assist in maintaining equal spacing between the horizontal strands of fiber, two threaded spacing bars can be situated between each set of posts and end panels at an elevation the same as or slightly lower than that of the end panels. After the fibers have been strung completely along the length of the mould, an additional end panel is inserted into the slots at each end of the mould, and the process is repeated using a second set of threaded spacing bars and a second set of upright posts. The top surface of the spacing bars should, once again, be of the same height or slightly lower than the height of the end panels. The process, of course, may be repeated as many times as necessary to bring the cement to the desired height.

After the desired amount of fibers have been introduced into the cement, it is allowed to set under suitable conditions to produce the carbon fiber-reinforced cementitious structures of the invention.

Referring now to the drawings, FIG. 1 illustrates a cement beam 10 which has been reinforced with strands of carbon fiber 11. The strands are disposed in the beam in two horizontal rows.

Figure 2:
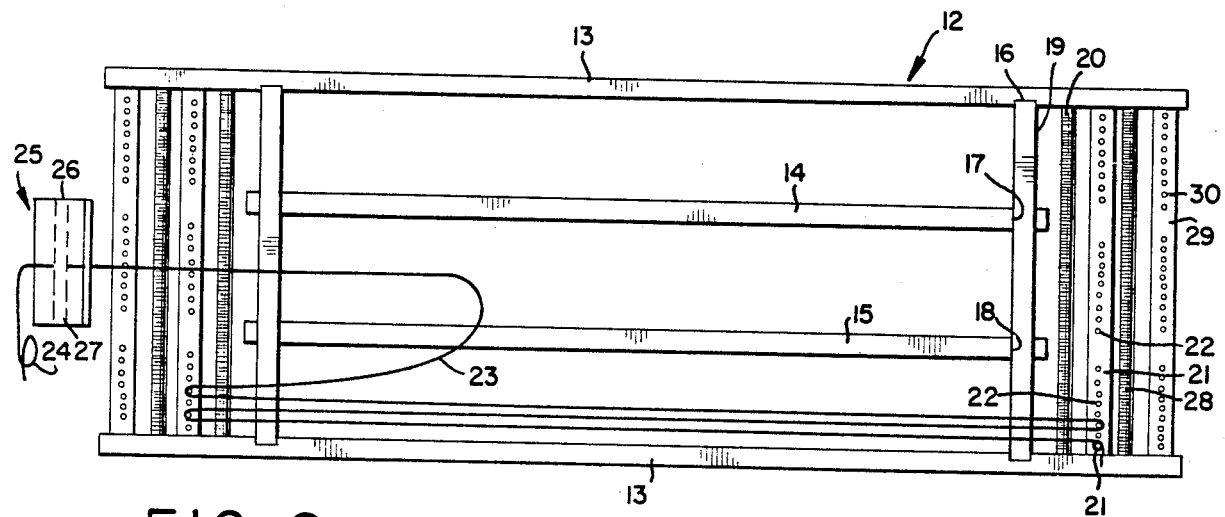
FIG. 2 is a top plane view of a mould suitable for the fabrication of the carbon fiber-reinforced cement beams of FIG. 1. The view shows the first horizontal row of fiber strands being laid in the mould.
Figure 3:
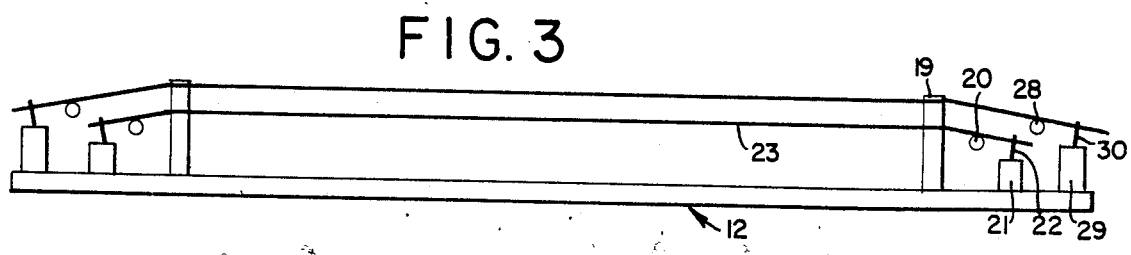
FIG. 3 is a side schematic view of one of the compartments of the mould depicted in FIG. 2 after two horizontal rows of fiber strands have been laid.

Cement beam 10 of FIG. 1 is manufactured in one of the compartments of mould 12 of FIGS. 2 and 3. The mould has side panels 13 and two divider panels 14 and 15 spaced equidistant between the side panels which divide the mould into three compartments. Side panels 13 contain slots 16 near each of their ends, and divider panels 14 and 15 contain slots 17 and 18 near each of their ends, to receive end panels 19. Side panels 13 and divider panels 14 and 15 are of equal height while end panels 19 are of a height which is only a fraction of that of the side panels and divider panels. Spacing bars 20 are positioned between end panels 19 and stands 21 containing upright posts 22 which are positioned equidistant from each other in the stands. Spacing bars 20 are threaded across their lengths and their top surface is slightly lower than the height of end panels 19.

The mould is filled with cement to the level of end panels 19. A continuous strand of carbon fiber 23 is then drawn from spool 24 through bath 25 containing hydrophobic resin system 26. The bath also contains a bar 27 under which the carbon fiber strand 23 is passed to ensure complete immersion in hydrophobic resin system 26. After passing through the bath, carbon fiber strand 23 is tied to the first post at one end of one of the stands 21 and then strung back and forth along the length of the mould on the surface of the cement using posts 22 at each end of the mould to reverse direction of the strand and the threads of spacing bars 20 to assist in maintaining equal spacing between horizontal strands, in the manner shown in FIG. 2.

After the fiber has been strung completely across the width of the mould, it is secured to the last remaining post in stands 21, an additional end panel is inserted into the slots at each end of the mould, and the process is repeated using a second set of spacing bars 28 and a second set of upright posts 30 contained in stands 29. Spacing bars 28, like spacing bars 20, are threaded across their lengths and their top surface is the same height or slightly lower than that of the second set of end panels. The process, of course, may be repeated as many times as necessary to bring the cement level to the desired height.

After the desired amount of fibers have been introduced into the cement, it is allowed to set under suitable conditions to produce the carbon fiber-reinforced cementitious structures of the invention.

The following example is set forth for purposes of illustration so that those skilled in the art may better understand this invention. It should be understood that it is exemplary only, and should not be construed as limiting this invention in any manner.

EXAMPLE 1

A three compartment collapsible wooden mould was employed to produce three cement beams reinforced with strands of carbon fiber. The mould had two side panels and two divider panels spaced equidistant between the side panels which divided the mould into three compartments. The side panels and divider panels were 2 inches high and slotted near their ends so as to be capable of receiving a number of end panels of lesser height stacked one upon another. One end panel 1.4 inches high was placed into position in the slots at one end of the side panels and divider panels, and a like end panel was placed into position in the slots at the other end of the side panels and divider panels. The mould was now ready for use.

Each compartment of the assembled mould was then filled with a cementitious mix to a level equal to the height of the end panels. A small brush was employed during the early stages of filling to compact the mix into the edges and corners of each compartment. After the cementitious mix had reached the desired level, a straight edge was used to level and smooth the top surface. Finally, the mould was vibrated for five minutes on a vibration table.

The cementitious mix employed contained 100 parts by weight of cement and 30 parts by weight of water which had been thoroughly mixed in a power-operated mixer using a dough hook attachment. The cement employed was a Portland cement conforming to British Standard 12.

A single ply carbon fiber yarn* which had been passed through a liquid hydrophobic epoxy resin system** was then tied to the end nail of a row of upright nails positioned parallel to and just beyond one end panel of the mould. A like row of upright nails was positioned parallel to and just beyond the other end of the mould. From the first end nail the carbon fiber yarn was then strung on the surface of the cement along the length of the mould and around the end nail of the row of upright nails at the other end of the mould, and then back and forth around each of the nails at opposite ends of the mould until the yarn had been strung completely across the entire width of each compartment. The yarn was at all times stretched just tight enough to take up any slack. The free end of the yarn was then secured to the last remaining nail. To assist in maintaining equal spacing between the horizontal strands of fiber, two threaded spacing bars containing 20 threads per inch were positioned between each set of nails and end panels so that their top surfaces were at an elevation slightly lower than that of the end panels. The carbon fiber yarn was passed over these spacing bars, and between every other thread thereof, before being turned around the nails situated at the ends of the mould. In this manner, the entire width of each compartment was traversed with a layer of fiber yarn running along its length and spaced 0.1 inch apart.

*The yarn employed was "Thornel" 300, a single ply, 1717 denier, carbon fiber yarn containing 3000 filaments wherein the filaments are characterized by an average Young's modulus of $34 \times 10^6$ psi. and an average tensile strength of $360 \times 10^3$ psi. "Thornel" is a registered trademark of Union Carbide Corporation.

**The epoxy resin system employed was composed of one hundred (100) parts by weight of a commercially available liquid epoxy resin produced by the reaction of epichlorohydrin and 2,2-bis(4-hydroxyphenyl) propane (Epikote 828, manufactured by Shell Chemicals U.K. Ltd.) and one hundred (100) parts by weight of "Ancamine" R, a hydrophobic fatty amine epoxy resin hardening agent having an amine number of from 170 to 180. The system was both insoluble in water and capable of curing at room temperature simultaneously with the cement.

A second end panel 0.5 inch high was then inserted into the slots at each end of the mold and each compartment of the mould was filled with a second layer of cement to the height of the second end panels. To ensure good contact with the fibers, and to provide a good bond to the previous cement layer, the first portion of the cement was brushed onto the top of the fibers. The second cement layer was then consolidated by tamping with a straight edge rather than by vibration so as not to distort the fibers or the first layer of cement which might have started to set.

The resin bath was then emptied and refilled with a freshly mixed resin system, and a second layer of fibers were laid in place in the same manner as the first using a second set of spacing bars and a second set of nails. The second set of spacing bars, like the first, were threaded across their lengths (20 threads per inch) and their top surfaces were at an elevation slightly lower than that of the second set of end panels.

Finally, a third end panel 0.1 inch high was installed into the slots at each end of the mould and each compartment was again filled with a third and final layer of cement to the height of the end panels in the same manner as before. The three specimens, which were $25'' \times 3'' \times 2''$ in size, were allowed to set in the mould for 18-20 hours, after which they were removed from the mould and further cured for 28 days in water at room temperature. At the end of the 28-day cure period, the specimens were removed from the water and tested for flexural strength by subjecting them to three-point bending over a 10'' span in a 12,000 lb. Avery universal test machine. The test beams were supported at both ends by support rollers 0.75 inch in diameter with the fibers on the tension side (supported by the rollers), and pressure was applied at the center of the sample by means of a loading roller 1 inch in diameter. Loading pressure was increased at the rate of approximately 1000 psi./min. until the beam foiled. Each beam was tested within 30 minutes of removal from the water in which it was cured. The beams had a mean flexural strength of 2210 psi.

The mean flexural strength of three beams prepared in like manner but without carbon fiber reinforcement was 1390 psi. Beams prepared in like manner with carbon fiber reinforcement, but without pre-treating the fibers with a hydrophobic resin, likewise had a mean flexural strength of only 1390 psi.

What is claimed is:

1. A process for producing a carbon fiber-reinforced cementitious structure having improved flexural strength which comprises filling a mould with a cementitious mix to a desired level so as to form a first layer, impregnating multifilament strands of carbon fiber with a liquid hydrophobic resin system, arranging said impregnated strands in substantially parallel rows along a length of the mould in contact with the surface of said first layer of cement, adding a second layer of the cementitious mix to said first layer while said first layer is still in the uncured condition and in such manner that the cementitious mix of said second layer also contacts said impregnated strands thereby to enclose the same in cement, and simultaneously curing the hydrophobic resin and cementitious mix to produce said carbon fiber-reinforced cementitious structure.

2. A process as in claim 1 wherein a continuous strand of carbon fiber is impregnated with a liquid hydrophobic resin system and then strung back and forth along a length of said mould.

3. A process as in claim 1 wherein the hydrophobic resin system is an epoxy resin system comprised of an epoxy resin and a reactive epoxy resin hardener.

4. A process as in claim 3 wherein the epoxy resin hardener is a hydrophobic fatty amine.

5. A process as in claim 4 wherein the hydrophobic fatty amine has an amine number of from 170 to 180.

* * * * *